United States Patent [19]

Hensel

[11] 4,018,145
[45] Apr. 19, 1977

[54] APPARATUS FOR DRAINING WHEY FROM CHEESE

[76] Inventor: Otis O. Hensel, P.O. Box 185, Hustisford, Wis. 53084

[22] Filed: Aug. 19, 1974

[21] Appl. No.: 498,512

[52] U.S. Cl. .................. 99/458; 100/110; 210/498
[51] Int. Cl.² .............. A01J 11/06; B30B 9/06; B01D 39/10
[58] Field of Search .......... 100/110, 130, 131, 115, 100/125; 99/456, 457, 458, 452, 453, 454, 467, 472, 508; 210/498

[56] References Cited

UNITED STATES PATENTS

| 801,832 | 10/1905 | Metivie | 100/125 |
|---|---|---|---|
| 1,348,004 | 7/1920 | Henry | 100/115 X |
| 3,468,026 | 9/1969 | Robertson et al. | 99/454 |
| 3,713,850 | 1/1973 | Gasbjerg | 99/452 |
| 3,719,994 | 3/1973 | Hensel | 99/458 X |

FOREIGN PATENTS OR APPLICATIONS

| 1,342,423 | 1962 | France | 99/458 |
| 1,144,968 | 10/1961 | Germany | 99/458 |

Primary Examiner—Harvey C. Hornsby
Assistant Examiner—Robert Pous
Attorney, Agent, or Firm—Andrus, Sceales, Starke & Sawall

[57] ABSTRACT

An apparatus for draining whey from cheese curd. The cheese curd to be treated is contained within an open ended box or container and the lower end of the box is enclosed by a support plate while the upper end of the box is enclosed by a perforated lid. The support plate is provided with a plurality of drain holes and is also formed with a series of downwardly extending grooves which extend from the interior of the plate to the peripheral edge. The grooves are generally V-shaped in cross section and have a greater depth than width. During vacuum draining of the cheese curd, the whey is drained through the holes in the support plate as well as along the grooves to thereby provide improved drainage characteristics for the mass of cheese curd.

3 Claims, 5 Drawing Figures

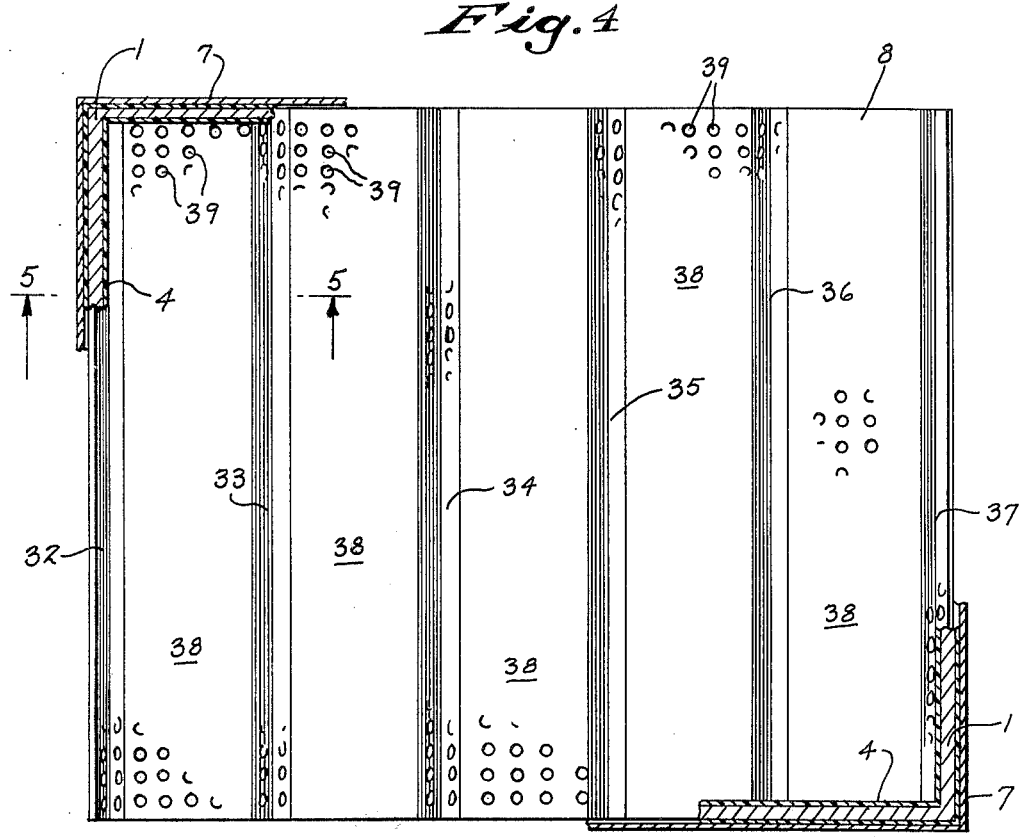
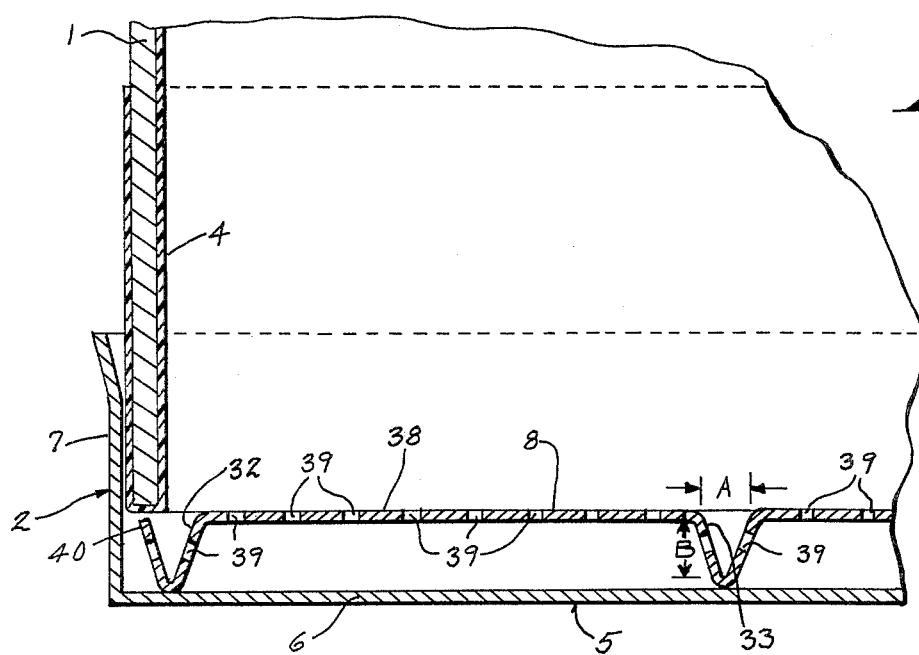

APPARATUS FOR DRAINING WHEY FROM CHEESE

BACKGROUND OF THE INVENTION

In the conventional cheese making process for making cheddar and Colby cheese, cheese curd is removed from the cheese making vat and placed in an open topped box or container, such as that disclosed in U.S. Pat. No. 3,719,994. After the box is filled, the curd is pressed and subjected to a vacuum treatment to remove a substantial portion of the whey from the curd.

With the use of the apparatus shown in the above mentioned Pat. No. 3,719,994, a perforated lid is attached to the upper end of the box and the box is placed in a supporting frame. The frame is mounted within a cradle that is suspended from an overhead rail, and the cradle includes an outer cradle member, which is mounted for movement on the rail, and an inner cradle member which is pivotally connected to the outer cradle member and can be tilted to a downwardly inclined position to permit residual whey to drain from the cheese curd through the perforated lid. When in the downwardly inclined position, the box can be rotated about its longitudinal axis to aid in draining of the whey from all areas of the mass of cheese curd.

In the past the box which contains the cheese curd has been formed with an open bottom and is supported within the frame on a plate mounted on the base of the frame. The support plate is usually formed with dimpled perforations through which the whey is drained, and even though the dimples bear on the base of the supporting frame, deformation has occurred in the support plate during the vacuum draining operation.

SUMMARY OF THE INVENTION

The invention is directed to an improvement to the apparatus for draining whey from cheese curd as disclosed in U.S. Pat. No. 3,719,994. The lower open end of the box which contains the cheese curd is enclosed by a bottom plate which is supported on the base of the frame, and in accordance with the invention, the bottom plate is provided with a series of holes or perforations and is also formed with a series of downwardly extending grooves that extend from the interior of the plate to the peripheral edge. The grooves are generally V-shaped in cross section and have a greater depth than width, with the depth of the grooves being less tha 1.25 inch.

In use of the apparatus of the invention, the support plate is initially placed on the base of the frame and the box is then positioned on the support plate with a standard polyethylene liner doubled back over both the open upper end and open lower end of the box. The cheese curd is deposited into the box and compressed by a mechanical and/or vacuum treatment, and during the treatment, a substantial portion of the whey is forced downwardly from the mass of curd through the support plate to a drainage line. The whey drains through the holes in the support plate and downwardly into the grooves for discharge to the drain line.

The support plate, as used in the invention, provides improved drainage for the mass of cheese curd and is particularly effective in obtaining adequate drainage of the whey from the center of the cheese mass. As the support plate provides better drainage for the mass of cheese curd, the apparatus can be utilized with both cheddar and stirred-curd cheese, where formerly, the aparatus using the conventional type of support plate, was suitable only for the manufacture of cheddar cheese.

The grooves in the support plate not only provide improved drainage, but also provide increased rigidity for the support plate so that the plate will not be deformed or bent during the vacuum or pressing operation.

Other objects and advantages will appear in the course of the following description.

DESCRIPTION OF THE DRAWINGS

The drawings illustrate the best mode presently contemplated of carrying out of the invention.

In the drawings:

FIG. 4 is a plan view of the support plate for the box; and

FIG. 5 is a section taken along line 5—5 of FIG. 4.

DESCRIPTION OF THE ILUSTRATED EMBODIMENT

Figure 1:
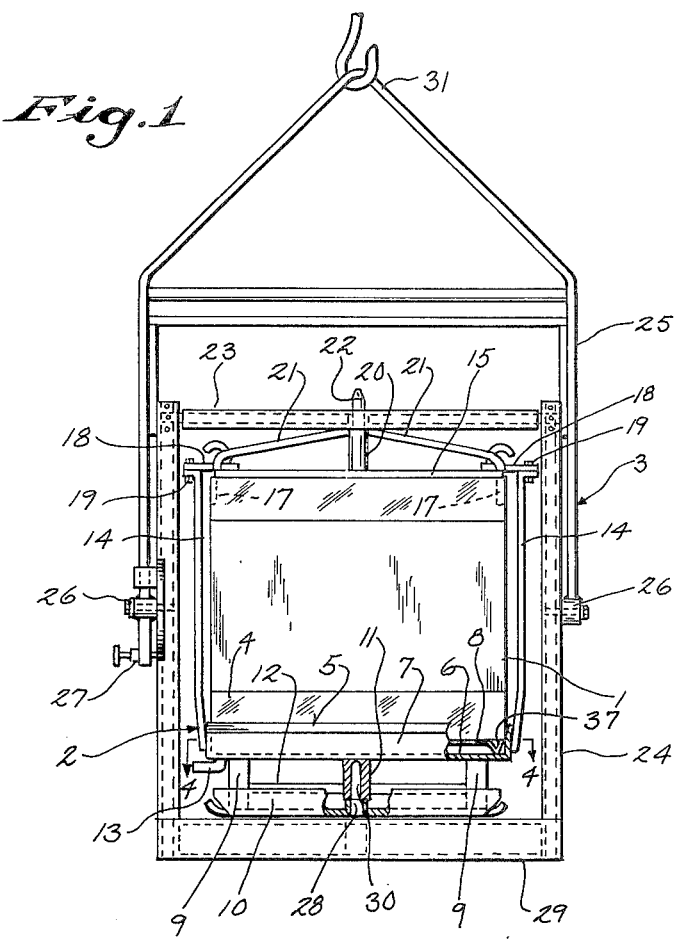
FIG. 1 is a side elevation of the apparatus for draining whey from cheese curd with parts broken away in section.
Figure 2:
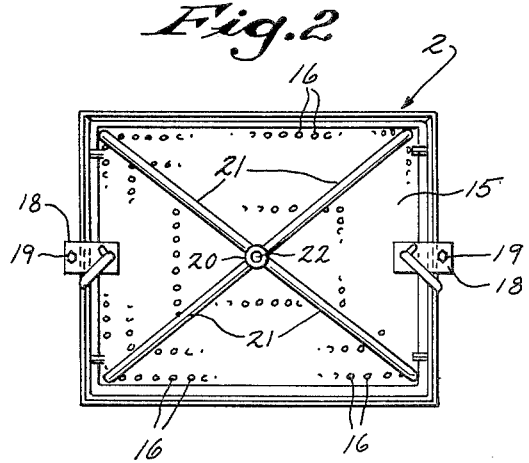
FIG. 2 is a top view of the frame.
Figure 3:
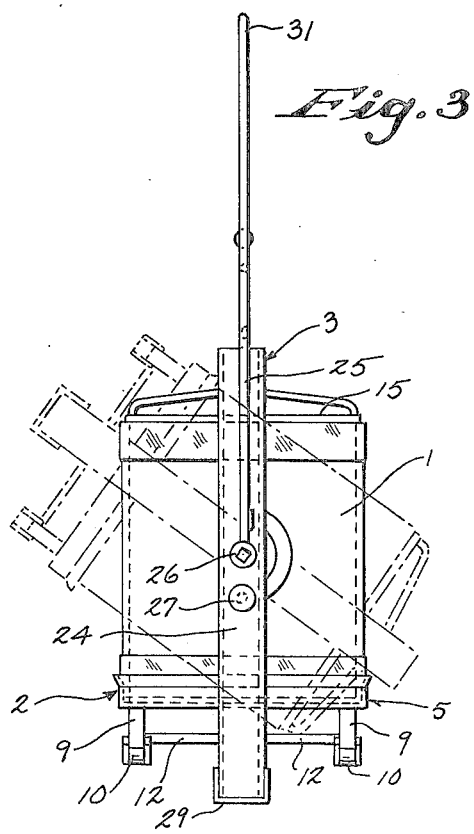
FIG. 3 is a side elevation of the apparatus as shown in FIG. 1 with the frame and box being shown in the tilted position by the phantom lines.

FIGS. 1-3 illustrate an apparatus for pressing and draining whey from cheese curd similar to that disclosed in U.S. Pat. No. 3,719,994. In general, the apparatus comprises an open-ended box 1 to contain the cheese curd, and the box is supported in a frame 2 which in turn is mounted in cradle 3. The box 1, as shown in the drawings, is generally rectangular in cross section and can be fabricated from plywood. A standard plastic liner 4 made of polyethylene, or the like, serves to line the box and prevent direct contact between the cheese curd and the box, as shown in FIG. 6.

The frame 2 includes a supporting base 5 composed of a base plate 6 and an upstanding peripheral flange 7. The plate 6 has a shape which corresponds to the cross-sectional shape of the box and the flange prevents displacement of the box. The lower open end of the box is supported on a bottom plate 8 which rests on the base plate 6 of the frame.

A series of legs 9 extend downwardly from the plate 6 and each corresponding pair of legs is connected to a skid 10 which enables the frame to be transported over the ground. Located centrally of the base plate 6 is a sleeve 11 which extends downwardly from the plate and is supported by a series of rod-like braces 12 that are connected between sleeve 11 and the legs 9.

Whey can be drained from the base of the frame 2 through a drain conduit 13 which is connected to base plate 6.

Extending upwardly from the opposite sides of the base 5 are a pair of vertical support bars 14 which terminate in outwardly extending flanges. The open upper end of the box 1 is adapted to be enclosed by a lid 15 having a series of holes 16 through which the whey can drain from the box when the box is inverted, as illustrated by the phantom lines in FIG. 3.

To align the lid 15 with respect to the box 1, positioning rods 17 are secured to the four corners of the lid and extend downwardly within the box. Lugs 18 extend outwardly from the lid and are adapted to be positioned over the upper flanges of the supports 14. Bolts 19 connect the lugs 18 to the flanges of the support 14 to secure the lid 15 to the frame 2.

Located centrally of the lid 15 is a vertical rod 20 which is supported by a series of braces 21 and a pin 22 extends upwardly from rod 20 and is adapted to be journaled for rotation within a cross bar 23 of the inner cradle member 24 of cradle 3.

The cradle 3 also includes an outer cradle 25 and the inner cradle member 24 is mounted for tilting movement with respect to the outer cradle member by pivots 26. A locking mechanism 27 is employed to lock the inner cradle member at the desired angularity with respect to the outer cradle member.

As best shown in FIG. 1, a rod 28 extends upwardly from a base 29 of the outer cradle member and a pin 30 formed on the end of the rod is journaled in the sleeve 11 of the base 5. As the journaling pins 22 and 30 are in axial alignment the box 1 and frame 2 can be rotated axially respect to the inner cradle member 24. The upper end of the outer cradle member 25 terminates in an apex 31 which can be engaged by hoist to transport the cradle 3 and frame 2.

In accordance with the invention, the bottom plate 8 is provided with a series of generally parallel grooves 32–37 which extend across the plate. As best illustrated in FIG. 5, the portions 38 of plate 8 between the grooves 32–37 are generally flat, and a series of holes or ports 39 are formed in the flat portions 38, as well as in the grooves 32–37. It is contemplated that in certain instances that the drain holes 39 may be located only in the flat surfaces 38.

As best illustrated in FIG. 6, the side edges 40 bordering the grooves 32 and 37 terminate at a slightly lower level than the surfaces 38. As the edges 40 can be relatively sharp, the lowered height of the edges 40 will space the edges from the lower end of the box, as shown in FIG. 6, so that the plastic liner 4 which is doubled back around the bottom edge of the box will not be cut by the edge 40, but will pass freely within the clearance between the lower end of the box 1 and the edge 40.

While the drawings have illustrated the grooves 32–37 as being parallel and extending between opposite edges of the bottom plate 8, it is contemplated that any number of grooves can be provided in any type of pattern. However, it is important that at least a portion of the grooves extend to the peripheral edge of the bottom plate so that the whey flowing within the grooves can be drained to the outer edge of the box.

It has been found that the grooves, which are generally V-shaped in cross section should have a depth within the range of 0.25 to 1.25 inches with a depth of about 0.65 to 0.75 inch being preferred. The grooves have a maximum width, as shown by dimension A in FIG. 6 in the range of 0.20 to 1.0 inch, with a width of 0.50 to 0.60 inch being preferred, and the depth of the grooves indicated by B in FIG. 6, should be greater than the width, dimension A.

The dimensions of the groove are important in order to provide adequate drainage through the grooves. During the pressing, the cheese will be forced into the grooves, and if the grooves are too large, the cheese within the grooves will skin over which will restrict further drainage. On the other hand, if the grooves are too small, adequate drainage will not be achieved.

As a further consideration, the cheese curd is pressed into the grooves and will appear as ridges on the cheese block after it has been removed from the box. If the grooves 32–37 in the bottom plate are deeper than the aforementioned range, the resulting ridges cannot be pressed back into the block of cheese after the cheese has been removed from the box, with the result that the cheese ridges must be cut from the block. This requires additional labor, and results in the discard of cheese. However, if the grooves have a depth in the range of 0.25 to 1.25 inches, not only is adequate drainage provided, but the cheese ridges which are formed on the outer surface of the cheese block can be readily pressed back into the cheese block after the block has been removed from the box.

In use of the apparatus of the invention, the bottom plate 8 is placed in the frame 2 and the box 1 is placed upon the bottom plate 8 with the ends of the liner 4 doubled over both the upper and lower edges of the box. As shown in FIG. 6, the liner 4 is located within the space between the edge 40 of the bottom plate 8 and the lower edge of the box.

The box 1 is then filled with cheese curd and a vacuum is applied to the mass of cheese curd through the drain connection 13, thereby causing a substantial portion of the whey to flow downwardly through the cheese and be discharged through the holes 39 and through the grooves 32–37 to the drain 13.

After the vacuum draining period, the lid 15 is attached to the box 1, and the box and frame are then mounted in the cradle 3 and tilted downwardly, as disclosed in U.S. Pat. No. 3,719,994, to drain the residual whey toward the low end of the box where it is discharged through holes 16 in the lid. Approximately every 15 minutes the box, while in an inclined position, is rotated approximately 90° about its longitudinal axis and maintained in this position for an additional 15 minute period. This procedure is repeated for a period of about 1 hour.

Following this, the box is returned to an upright position and the box 1 and frame 2 are placed into a vacuum chamber which serves to remove any further residual whey and cool and compress the curd. After this vacuum treatment, the lid is removed, the box is inverted and the cheese mass is dumped from the box. The V-shaped ridges in the end of the cheese block formed by the cheese curd which was pressed into the grooves 32–37 is pressed back into the cheese block so that all surfaces of the cheese block are smooth and flat. The ends of the liner 4 are then folded over the block of cheese and sealed with a wax sealer. After sealing of the liner 4, the block of cheese can be transferred to an aging environment.

The bottom plate 8 provides improved drainage for the mass of cheese curd, particularly from the center of the large curd mass, thereby eliminating the possibility of souring and spoiling of the central portion of the cheese curd mass. As better drainage is achieved, the apparatus can be used for making stirred curd cheese, as well as cheddar cheese.

The grooves 32–37 also act as reinforcing ribs to provide increased strength and rigidity for the bottom plate to prevent bending and deformation during the vacuum draining operation.

Various modes of carrying out the invention are contemplated as being within the scope of the following claims particularly pointing out and distinctly claiming the subject matter which is regarded as the invention.

I claim:

1. An apparatus for draining whey from cheese curd, comprising an open ended container to contain the cheese curd, said container having a generally rectangular cross section, a frame to support the container and including a base, a support plate mounted on the base and enclosing the lower end of said container, a removable lid to enclose the open top of the container and having a series of openings therein, a cradle including a first cradle member and a second cradle member to support the frame, first journaling means for journaling the base of the frame with respect to the second cradle member, second journaling means for journaling the lid with respect to the second cradle member, said first and second journaling means being arranged to permit rotation of said frame and said container, means pivotally connecting the second cradle means to the first cradle member for moving the frame and the container from a generally upright position to an inclined position, said support plate having a series of downwardly extending grooves, said grooves having a generally V-shaped cross section and terminating at a relatively sharp lower edge and having a greater depth than width, each groove having at least one open end disposed at the peripheral edge of the support plate, said support plate also being provided with a series of drain holes, the whey draining through said holes and along said grooves and being discharged through said open ends, at least a first of said grooves being located along a side extremity of said support plate and said first groove terminating in a side edge, the upper extremity of said side edge being at a lower level than the upper extremity of the portion of the support plate located adjacent said first groove, the lower end of the container being spaced upwardly from said side edge to provide a clearance therebetween, and a plastic liner disposed on the inner surface of the container and having a lower end doubled back over the lower open end of the container and disposed within said clearance.

2. The apparatus of claim 1, wherein said support plate is generally rectangular in shape and said grooves are generally parallel and extend across the support plate.

3. The apparatus of claim 1, wherein the grooves have a depth in the range of 0.25 to 1.25 inches.

* * * * *